United States Patent
Ford, Jr. et al.

(10) Patent No.: US 7,181,654 B2
(45) Date of Patent: Feb. 20, 2007

(54) SYSTEM AND METHOD FOR DETECTING AN ABNORMAL SITUATION ASSOCIATED WITH A REACTOR

(75) Inventors: Ferrill E. Ford, Jr., Pflugerville, TX (US); Evren Eryurek, Edina, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/944,610

(22) Filed: Sep. 17, 2004

(65) Prior Publication Data

US 2006/0064182 A1    Mar. 23, 2006

(51) Int. Cl.
G06F 11/00 (2006.01)
G06F 19/00 (2006.01)
G05B 9/02 (2006.01)
G05D 16/00 (2006.01)
G08B 23/00 (2006.01)
B01F 13/00 (2006.01)

(52) U.S. Cl. ............... 714/47; 714/37; 714/48; 700/51; 700/80; 700/108; 700/301; 702/35; 702/140; 702/179; 702/185; 340/517; 366/343

(58) Field of Classification Search ............ 702/33–36, 702/44, 47, 50, 82, 138, 179–181, 182, 185; 700/28, 32–34, 49–51, 79, 80, 103, 104, 700/108, 301; 706/45–48, 52–55, 59–61, 706/906, 907, 914, 915; 714/1, 25, 26, 37, 714/47, 48, 57; 340/500, 501, 506, 511, 340/517, 521, 523; 366/342, 343, 348
See application file for complete search history.

(56) References Cited

U.S. PATENT DOCUMENTS 4,483,192 A * 11/1984 Wachter .................. 73/311

(Continued)

FOREIGN PATENT DOCUMENTS

EP    0 612 039 A3    8/1994

(Continued)

OTHER PUBLICATIONS

R. Bardtenschlager et al., "Automatic Process control for vacuum dispensing equipment", Electrical Insulation Conference and Electrical Manufacturing & Coil Winding Conference Proceedings, Sep. 22-25, 1997, pp. 1-6.*

(Continued)

Primary Examiner—Crystal J. Barnes
(74) Attorney, Agent, or Firm—Marshall, Gerstein & Borun LLP

(57) ABSTRACT

A system for detecting abnormal situations associated with a reactor in a process plant receives statistical data associated with pressure within a reactor vessel. For example, a pressure sensor device disposed at least partially within the reactor vessel may generate the statistical data based on a pressure signal. The statistical data is analyzed to detect whether one or more abnormal situations associated with an agitator of the reactor exist. For example, the statistical data may be analyzed to detect whether the agitator is no longer turning, is turning at a rate that is different than expected, is out of balance, is broken, etc. If an abnormal situation is detected, an indicator of the abnormal situation may be generated.

34 Claims, 6 Drawing Sheets

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,853,175 A | 8/1989 | Book, Sr. | |
| 4,858,144 A | 8/1989 | Marsaly et al. | |
| 4,885,694 A | 12/1989 | Pray et al. | |
| RE33,162 E * | 2/1990 | Yoshida et al. | 700/291 |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |
| 5,050,095 A | 9/1991 | Samad | |
| 5,070,458 A | 12/1991 | Gilmore et al. | |
| 5,121,467 A | 6/1992 | Skeirik | |
| 5,134,574 A | 7/1992 | Beaverstock et al. | |
| 5,140,530 A | 8/1992 | Guha et al. | |
| 5,142,612 A | 8/1992 | Skeirik | |
| 5,161,013 A | 11/1992 | Rylander et al. | |
| 5,167,009 A | 11/1992 | Skeirik | |
| 5,187,674 A | 2/1993 | Bonne | |
| 5,189,232 A | 2/1993 | Shabtai et al. | |
| 5,193,143 A | 3/1993 | Kaemmerer et al. | |
| 5,197,114 A | 3/1993 | Skeirik | |
| 5,212,765 A | 5/1993 | Skeirik | |
| 5,224,203 A | 6/1993 | Skeirik | |
| 5,282,261 A | 1/1994 | Skeirik | |
| 5,291,190 A | 3/1994 | Scarola et al. | |
| 5,301,101 A | 4/1994 | MacArthur et al. | |
| 5,311,447 A | 5/1994 | Bonne | |
| 5,311,562 A | 5/1994 | Palusamy et al. | |
| 5,325,522 A | 6/1994 | Vaughn | |
| 5,333,298 A | 7/1994 | Bland et al. | |
| 5,351,184 A | 9/1994 | Lu et al. | |
| 5,353,207 A | 10/1994 | Keeler et al. | |
| 5,369,599 A | 11/1994 | Sadjadi et al. | |
| 5,373,452 A | 12/1994 | Guha | |
| 5,384,698 A | 1/1995 | Jelinek | |
| 5,390,326 A | 2/1995 | Shah | |
| 5,396,415 A | 3/1995 | Konar et al. | |
| 5,398,303 A | 3/1995 | Tanaka | |
| 5,408,406 A | 4/1995 | Mathur et al. | |
| 5,442,544 A | 8/1995 | Jelinek | |
| 5,461,570 A | 10/1995 | Wang et al. | |
| 5,486,920 A | 1/1996 | Killpatrick et al. | |
| 5,486,996 A | 1/1996 | Samad et al. | |
| 5,488,697 A | 1/1996 | Kaemmerer et al. | |
| 5,499,188 A | 3/1996 | Kline, Jr. et al. | |
| 5,521,842 A | 5/1996 | Yamoda | |
| 5,533,413 A | 7/1996 | Kobayashi et al. | |
| 5,537,310 A | 7/1996 | Tanake et al. | |
| 5,541,833 A | 7/1996 | Bristol et al. | |
| 5,546,301 A | 8/1996 | Agrawal et al. | |
| 5,559,690 A | 9/1996 | Keeler et al. | |
| 5,561,599 A | 10/1996 | Lu | |
| 5,566,065 A | 10/1996 | Hansen et al. | |
| 5,570,282 A | 10/1996 | Hansen et al. | |
| 5,572,420 A | 11/1996 | Lu | |
| 5,574,638 A | 11/1996 | Lu | |
| 5,596,704 A | 1/1997 | Geddes et al. | |
| 5,640,491 A | 6/1997 | Bhat et al. | |
| 5,640,493 A | 6/1997 | Skeirik | |
| 5,666,297 A | 9/1997 | Britt et al. | |
| 5,680,409 A | 10/1997 | Qin et al. | |
| 5,687,090 A | 11/1997 | Chen et al. | |
| 5,692,158 A | 11/1997 | Degeneff et al. | |
| 5,704,011 A | 12/1997 | Hansen et al. | |
| 5,715,158 A | 2/1998 | Chen | |
| 5,729,661 A | 3/1998 | Keeler et al. | |
| 5,740,324 A | 4/1998 | Mathur et al. | |
| 5,742,513 A | 4/1998 | Bouhenguel et al. | |
| 5,761,086 A * | 6/1998 | Cranford, III | 702/44 |
| 5,761,518 A | 6/1998 | Boehling et al. | |
| 5,764,891 A | 6/1998 | Warrior | |
| 5,768,119 A | 6/1998 | Havekost et al. | |
| 5,777,872 A | 7/1998 | He | |
| 5,781,432 A | 7/1998 | Keeler et al. | |
| 5,790,898 A | 8/1998 | Kishima et al. | |
| 5,796,609 A | 8/1998 | Tao et al. | |
| 5,798,939 A | 8/1998 | Ochoa et al. | |
| 5,805,442 A | 9/1998 | Crater et al. | |
| 5,809,490 A | 9/1998 | Guiver et al. | |
| 5,819,050 A | 10/1998 | Boehling et al. | |
| 5,819,232 A | 10/1998 | Shipman | |
| 5,825,645 A | 10/1998 | Konar et al. | |
| 5,826,249 A | 10/1998 | Skeirik | |
| 5,839,291 A * | 11/1998 | Chang | 62/126 |
| 5,842,189 A | 11/1998 | Keeler et al. | |
| 5,847,952 A | 12/1998 | Samad | |
| 5,859,773 A | 1/1999 | Keeler et al. | |
| 5,859,964 A | 1/1999 | Wang et al. | |
| 5,877,954 A | 3/1999 | Klimasauskas et al. | |
| 5,892,679 A | 4/1999 | He | |
| 5,892,939 A | 4/1999 | Call et al. | |
| 5,898,869 A | 4/1999 | Anderson | |
| 5,901,058 A | 5/1999 | Steinman et al. | |
| 5,905,989 A | 5/1999 | Biggs | |
| 5,907,701 A | 5/1999 | Hanson | |
| 5,909,370 A | 6/1999 | Lynch | |
| 5,909,541 A | 6/1999 | Sampson et al. | |
| 5,909,586 A | 6/1999 | Anderson | |
| 5,914,875 A * | 6/1999 | Monta et al. | 700/79 |
| 5,918,233 A | 6/1999 | La Chance et al. | |
| 5,924,086 A | 7/1999 | Mathur et al. | |
| 5,940,290 A | 8/1999 | Dixon | |
| 5,948,101 A | 9/1999 | David et al. | |
| 5,949,417 A | 9/1999 | Calder | |
| 5,960,214 A | 9/1999 | Sharpe, Jr. et al. | |
| 5,960,441 A | 9/1999 | Bland et al. | |
| 5,975,737 A | 11/1999 | Crater et al. | |
| 5,984,502 A | 11/1999 | Calder | |
| 5,988,847 A | 11/1999 | McLaughlin et al. | |
| 6,008,985 A | 12/1999 | Lake et al. | |
| 6,017,143 A | 1/2000 | Eryurek et al. | |
| 6,026,352 A | 2/2000 | Burns et al. | |
| 6,033,257 A | 3/2000 | Lake et al. | |
| 6,041,263 A | 3/2000 | Boston et al. | |
| 6,047,220 A | 4/2000 | Eryurek | |
| 6,047,221 A | 4/2000 | Piche et al. | |
| 6,055,483 A | 4/2000 | Lu | |
| 6,061,603 A | 5/2000 | Papadopoulos et al. | |
| 6,067,505 A | 5/2000 | Bonoyer et al. | |
| 6,076,124 A | 6/2000 | Korowitz et al. | |
| 6,078,843 A | 6/2000 | Shavit | |
| 6,093,211 A | 7/2000 | Hamielec et al. | |
| 6,106,785 A | 8/2000 | Havlena et al. | |
| 6,108,616 A | 8/2000 | Borchers et al. | |
| 6,110,214 A | 8/2000 | Klimasauskas | |
| 6,119,047 A | 9/2000 | Eryurek et al. | |
| 6,122,555 A | 9/2000 | Lu | |
| 6,128,279 A | 10/2000 | O'Neil et al. | |
| 6,144,952 A | 11/2000 | Keeler et al. | |
| 6,169,980 B1 | 1/2001 | Keeler et al. | |
| 6,266,726 B1 | 7/2001 | Nixon et al. | |
| 6,298,377 B1 | 10/2001 | Hartikainen et al. | |
| 6,298,454 B1 | 10/2001 | Schleiss et al. | |

| | | |
|---|---|---|
| 6,317,701 B1 | 11/2001 | Pyötsiä et al. |
| 6,332,110 B1 | 12/2001 | Wolfe |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,615,090 B1 | 9/2003 | Blevins et al. |
| 6,633,782 B1 | 10/2003 | Schleiss et al. |
| 6,875,401 B1 * | 4/2005 | Suzuki et al. ............. 422/63 |
| 2002/0022894 A1 | 2/2002 | Eryurek et al. |
| 2002/0038156 A1 | 3/2002 | Eryurek et al. |
| 2002/0077711 A1 | 6/2002 | Nixon et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0014500 A1 | 1/2003 | Schleiss et al. |
| 2003/0121330 A1 | 7/2003 | Muhle et al. |

FOREIGN PATENT DOCUMENTS

| | | |
|---|---|---|
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |
| JP | 06273151 A * | 9/1994 |

OTHER PUBLICATIONS

Wernwe Kalkhoff, "Agent-Oriented Robot Task Transformation", Proceedings of the International Symposium on Intelligent Control, IEEE, pp. 242-247 (Aug. 27, 1995).

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

Ashish Mehta, et al., "Feedforward Neural Networks for Process Identification and Prediction," presented at ISA 2001, Houston, Texas, Sep. 2001.

Vasiliki Tzovla, et al., "Abnormal Condition Management Using Expert Systems," presented at ISA 2001, Houston, Texas, Sep. 2001.

International Search Report for PCT/US2005/028242 dated Dec. 21, 2005.

Written Opinion for PCT/US2005/028242 dated Dec. 21, 2005.

* cited by examiner

SYSTEM AND METHOD FOR DETECTING AN ABNORMAL SITUATION ASSOCIATED WITH A REACTOR

FIELD OF THE DISCLOSURE

This disclosure relates generally to performing diagnostics and maintenance in a process plant and, more particularly, to providing diagnostics capabilities related to a reactor.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS) application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

There is currently one technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Reactors are commonly used in the chemical and pharmaceutical industries. Typically, a reactor includes an agitator to mix various substances together. With some processes, the mixing causes an exothermic reaction. The rate at which the substances are added to the reactor is based, at least partially, on a cooling capacity of the reactor because, if the reactor becomes too hot, an explosion could occur or the quality and/or quantity of the output of the reactor could be reduced. If the agitator unexpectedly stops working, ingredients of the process may settle into layers of unreacted material within the reactor. If the agitator is then restarted, a large amount of the ingredients could suddenly react causing an explosion.

One technique to monitor whether the agitator is working involves monitoring a motor that drives the agitator. For example, if the motor is running, it may be assumed that the agitator is working. There are situations, however, in which the agitator stops working but the motor continues running. For example, a shaft of the agitator may break off from the motor. As another example, a coupling mechanism between the motor and the shaft may fail.

Additionally, if an agitator fails, it may cause damage to the reactor. For instance, some reactors are glass-lined. When a paddle of an agitator falls off, for example, it may render an expensive glass-line reactor unusable. Predicting such a failure, however, is difficult using existing techniques.

SUMMARY

A system for detecting abnormal situations associated with a reactor in a process plant receives statistical data associated with pressure within a reactor vessel. For example, a pressure sensor device disposed at least partially within the reactor vessel may generate the statistical data based on a pressure signal. The statistical data is analyzed to detect whether one or more abnormal situations associated with an agitator of the reactor exist. For example, the statistical data may be analyzed to detect whether the agitator is no longer turning, is turning at a rate that is different than expected, is out of balance, is broken, etc. If an abnormal situation is detected, an indicator of the abnormal situation may be generated.

DETAILED DESCRIPTION

Figure 1:
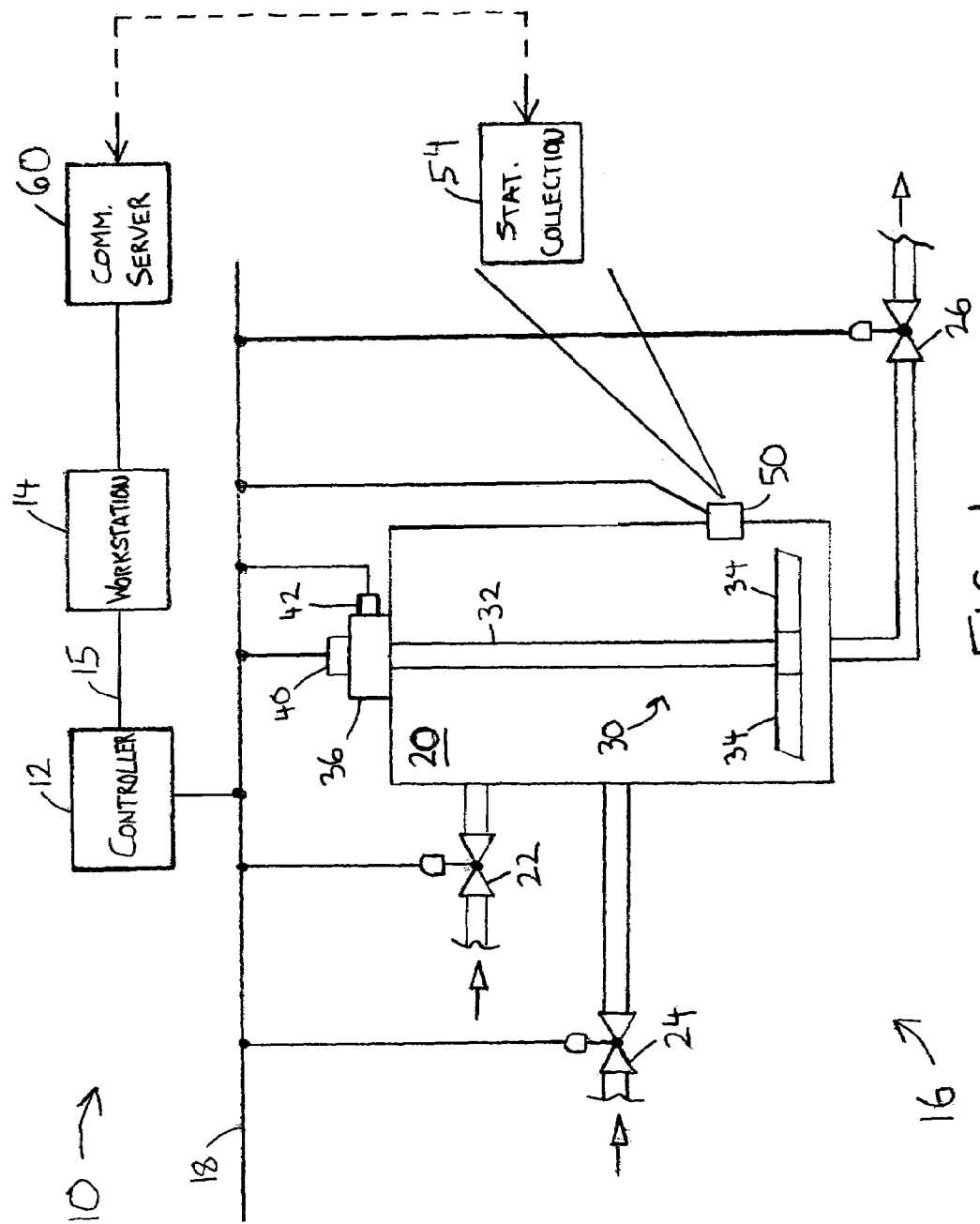
FIG. 1 is a block diagram of an example process plant control and diagnostics network.

FIG. 1 is a block diagram of an example process plant control and diagnostics network 10 that includes a process controller 12 coupled to a workstation 14 via a communication link 15. The communication link 15 may comprise, for example, an Ethernet communications connection, or any other type of wired, optical, or wireless communications connection. Additionally, the communication link 15 may be a continuous or intermittent link. The controller 12 is also coupled to devices or equipment within a process plant via an input/output (I/O) device (not shown) and a set of communication lines or a bus 18. In the example of FIG. 1, the controller 12 is coupled to devices and equipment associated with a reactor unit 16. The controller 12, which may be by way of example only, the DeltaV™ controller sold by Emerson Process Management, Inc., is capable of communicating with control elements, such as field devices and function blocks within field devices distributed throughout the process plant to perform one or more process control routines to thereby implement desired control of the reactor unit 16. These process control routines may be continuous or batch process control routines or procedures. The workstation 14 (which may comprise, for example, a personal computer, a server, etc.) may be used by one or more engineers or operators to design process control routines to be executed by the controller 12, to communicate with the controller 12 so as to download such process control routines, to receive and display information pertaining to the reactor unit 16 during operation of the process plant and to otherwise interact with the process control routines executed by the controller 12.

The workstation 14 includes a memory (not shown) for storing applications, such as configuration design applications, maintenance applications, user interface applications, diagnostics applications, etc., and for storing data, such as configuration data, maintenance data, diagnostics data, etc., pertaining to the configuration of the reactor unit 16. The workstation 14 also includes a processor (not shown) that executes the applications to, among other things, enable a user to design process control routines and download those process control routines to the controller 12. Likewise, the controller 12 includes a memory (not shown) for storing configuration data and process control routines to be used to control the reactor unit 16 and includes a processor (not shown) that executes the process control routines to implement a process control strategy. If the controller 12 is a DeltaV™ controller, it, in conjunction with one or more applications implemented by the workstation 14, may provide a graphical depiction of the process control routines within the controller 12 to a user illustrating the control elements within the process control routine and the manner in which these control elements are configured to provide control of the reactor unit 16.

In the example process plant control and diagnostics network 10 illustrated in FIG. 1, the controller 12 is communicatively coupled via the bus 18 to the reactor unit 16. The reactor unit 16 includes a reactor vessel 20, two input valves 22 and 24 connected so as to control fluid inlet lines providing fluid from, for example, a headtank (not shown) into the reactor vessel 20 and an output valve 26 connected so as to control fluid flow out of the reactor vessel 20 via an outlet fluid line. An agitator 30 is disposed within the reactor vessel 20. The agitator 30 includes a shaft 32 and paddles 34 coupled to the shaft 32. A motor 36 coupled to the shaft 32 causes the shaft 32 and paddles 34 to spin. A motor control element 40 is used to control the motor 36 and, thus, the agitator 30. A motor sensor 42, which may comprise, for example, a vibration sensor, a current load sensor, etc., may be used to monitor the operation of the motor 40.

A pressure sensing device 50, which may comprise a flanged differential pressure sensor, a bubble tube pressure sensor, etc., may be disposed within, at least partially, the reactor vessel 20 to permit sensing of pressure within the reactor vessel 20. The pressure sensing device 50 may also be used to sense the level of material within the reactor vessel 20.

As illustrated in FIG. 1, the controller 12 is communicatively coupled to the valves 22, 24, and 26, to the motor control element 40, to the motor sensor 42, and to the pressure sensing device 50 via the bus 18 to control the operation of these elements and/or to receive data from these elements. Of course, the controller 12 could be coupled to the elements of the reactor unit 16 via additional busses, via dedicated communication lines, such as 4–20 ma lines, HART communication lines, etc.

The valves, sensors and other equipment illustrated in FIG. 1 may be any desired kind or type of equipment including, for example, Fieldbus field devices, standard 4–20 ma field devices, HART field devices, etc. and may communicate with the controller 12 using any known or desired communication protocol such as the Fieldbus protocol, the HART protocol, the 4–20 ma analog protocol, etc. Still further, other types of devices may be connected to and be controlled by the controller 12 in any desired manner. Also, other controllers may be connected to the controller 12 and to the workstation 14 via, for example, the communication link 15 to control other devices or areas associated with the process plant and the operation of such additional controllers may be coordinated with the operation of the controller 12 illustrated in FIG. 1 in any desired or known manner.

The pressure sensing device 50 may include a memory (not shown) for storing routines such as a routine for implementing statistical data collection pertaining to pressure sensed by the pressure sensing device 50. The pressure sensing device 50 may also include a processor (not shown) that executes routines such as a routine for implementing statistical data collection. The routines stored and implemented by the pressure sensing device 50 may include one or more blocks 54 for collecting and/or processing statistical data associated with the pressure sensing device 50. For example, the block 54 could comprise an advanced diagnostics block (ADB), which is a known Foundation Fieldbus function block that can be added to Fieldbus devices to collect and process statistical data within Fieldbus devices. Other types of blocks or modules could also be used to collect device data and calculate, determine, and/or process one or more statistical measures or parameters for that data. Moreover, the pressure sensing device 50 need not comprise a Fieldbus device. Further, the block 54 may be implemented by any combination of software, firmware, and/or hardware within the pressure sensing device 50.

While the block 54 is illustrated as being located in the pressure sensing device 50, the block 54 or a similar block could be located, in part or in whole, in any number of the other field devices 22, 24, 26, 40, and 42, and could be located, in part or in whole, in other devices, such as the controller 12, an I/O device (not shown), the workstation 14, or some other device. It is to be understood that some or all of the other devices 22, 24, 26, 40, could implement other blocks or modules for collecting data associated with those other devices and for calculating, determining and/or processing one or more statistical measures or parameters for that data.

Generally speaking, the block 54, or sub-elements of the block 54, collects data, such as data related to the pressured sensed within the reactor vessel 20, and performs statistical processing or analysis on the data. The block 54 may include sub-elements such as one or more statistical process monitoring (SPM) blocks or units which may collect data related to the pressured sensed within the reactor vessel 20 or other data associated with the pressure sensing device 50 and perform one or more statistical calculations on the collected data to determine, for example, a mean, a median, a standard deviation, etc. of the collected data.

The term statistical process monitoring (SPM) block is used herein to describe functionality that performs statistical process monitoring on at least one process variable or other process parameter, and may be performed by any desired software, firmware or hardware implemented by or within the device or even outside of a device for which data is collected. It will be understood that, because the SPMs are generally implemented by, or as part of, the devices where the device data is collected, the SPMs can acquire quantitatively more and qualitatively more accurate process variable data. As a result, the SPM blocks are generally capable of determining better statistical calculations with respect to the collected process variable data than a block implemented outside of the device in which the process variable data is collected.

While the SPM blocks have been described herein as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of the block 54 may be performed or implemented as described in U.S. Pat. No. 6,017,143.

It is to be understood, however, that the block 54 may be performed or implemented using techniques different than those described in U.S. Pat. No. 6,017,143. As just one example, U.S. Pat. No. 6,615,090 to Blevins et al. describes a variability index generator that generates a variability indication for a function block within a process plant. In general, the variability indication provides a statistical measurement of the deviation of a parameter associated with the device or function block from a set point or other value associated with the device or function block. U.S. Pat. No. 6,615,090 is herby incorporated by reference herein in its entirety for all purposes.

Data gathered and generated by the block 54 may be made available to an external client, such as to the workstation 14 through the controller 12 and the communication link 15. Additionally or in the alternative, data gathered and generated by the block 54 may be made available to the workstation 14 through, for example, a communication server 60. The communication server 60 may comprise, for example, an Object Linking & Embedding (OLE) for Process Control (OPC) server, a server configured to operate in an Ovation® communications network, a web server, etc. The communication server 60 may receive data gathered and generated by the block 54 via a communication link such as a wireless connection, a hardwired connection, an intermittent connection (such as one that uses one or more handheld devices), or any other desired communication connection using any desired or appropriate communication protocol. Of course, any of the communication connections described herein may use an OPC communication server to integrate data received from different types of devices in a common or consistent format.

Still further, it is possible to implement SPM blocks in a workstation, server, personal computer, etc., or other field devices separate from the device 50 to perform statistical process monitoring outside of the device 50 that collects or generates the raw data, such as pressure data. Thus, for example, one or more SPM blocks could be implemented by the workstation 14. These SPM blocks could collect raw pressure data via, for example, the controller 12 or the communication server 60 and could calculate some statistical measure or parameter, such as a mean, a standard deviation, etc. for that pressure data. While these SPM blocks are not located in the device 50 which collects the data and, therefore, are generally not able to collect as much pressure data to perform the statistical calculations due to the communication requirements for this data, these blocks are helpful in determining statistical parameters for a device that does not have or support SPM functionality. Thus, it will be understood in the discussion below, that any statistical measurements or parameters described to be generated by SPM blocks, may be generated by SPM blocks implemented by the device 50 or by other devices.

Generally speaking, the process control and diagnostics system of FIG. 1 may be used to implement batch processes in which, for example, the workstation 14 executes a batch execution system that implements and coordinates different batch runs that utilize the reactor unit 16. Such a batch execution system may be stored in the workstation 14 of FIG. 1. The batch execution system could be stored in and executed in other workstations, or in other computers communicatively connected to the communication link 15 or the bus 18 in any desired manner, including in any wireless manner. Likewise, the batch execution system may be divided into various components or be associated with various components stored in and executed in different computers or workstations within the process plant. The process control and diagnostics system of FIG. 1 could similarly be used to implement a continuous process.

In operation, the controller 12 may cause, via the motor control element 40, the motor 36 to turn the agitator 30. The motor sensor 42 may provide data that indicates whether and/or at what speed the motor 36 is running. It may be difficult, however, to determine whether the agitator 32 is actually turning based on data provided by the motor sensor 42. For example, if the shaft 32 broke or a coupling mechanism (not shown) between the motor 36 and the shaft 32 fails, the motor 36 may continue running but the agitator 30 might not turn or might turn at a much slower rate than expected.

As the paddles 34 of the agitator 30 move past the pressure sensing device 50, the pressure sensed by the pressure sensing device 50 may change. For example, a spike in pressure may occur. If the agitator 30 includes two paddles 34, two spikes in pressure may occur for each rotation of the agitator 30. Similarly, if the agitator 30 includes three paddles 34, three spikes in pressure may occur for each rotation of the agitator 30. The pressure sensed by the pressure sensing device 50 may be used to detect an abnormal situation associated with the agitator 30. For example, the pressure sensed by the pressure sensing device 50 may be used to detect that the agitator has stopped turning or is turning at a slower rate than expected. Also, the pressure sensed by the pressure sensing device 50 may be used to detect other abnormal situations such as an agitator 30 that is out of balance, a broken paddle 34, etc.

Although only one pressure sensing device is shown in FIG. 1, one or more additional pressure sensing devices may also be included. Each of these additional pressure sensing devices may include, or have associated therewith, a corresponding block for collecting and/or processing statistical data, similar to the block 54. Similarly, other types of sensing devices could be included, such as an audio sensor, to generate additional data associated with the reactor vessel that could be used in determining whether an abnormal situation associated with the agitator 30 exists.

Figure 2:
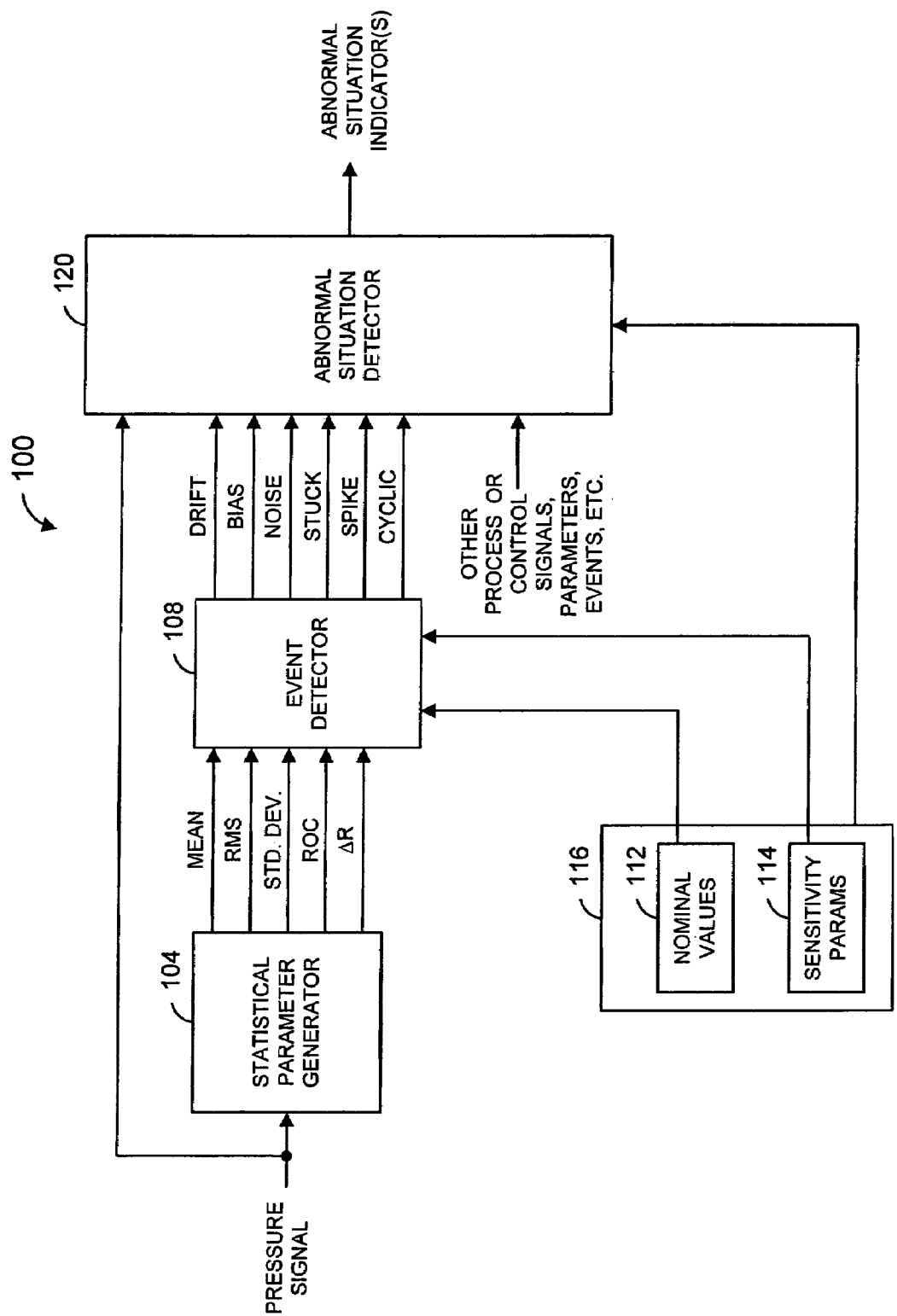
FIG. 2 is a block diagram of an example subsystem for generating an indicator of an abnormal situation based on a pressure signal.

FIG. 2 is a block diagram of an example subsystem 100 for generating statistical data associated with the pressure sensing device 50. The subsystem 100 may be implemented, for example, as part of the block 54 of FIG. 1, and may be implemented in whole or in part by the pressure sensing device 50. Further, each block illustrated in FIG. 2 may be implemented in whole or in part by the pressure sensing device 50. Thus, some or all of the subsystem 100 may be implemented by one or more other devices such as other field devices in the process plant, the controller 12, the workstation 14, the communication server 60, or some other computing device associated with the process plant. The subsystem 100 includes aspects similar to those of a process device described in U.S. Pat. No. 6,017,143.

A statistical parameter generator 104 receives a pressure signal generated by the pressure sensing device 50 and calculates statistical parameters for the pressure signal. These statistical parameters may include one or more of a standard deviation, a mean, a sample variance, a root-mean-square (RMS), a range ($\Delta R$) and rate of change (ROC) of the pressure signal, for example. Examples of equations for generating these parameters are:

$$\text{mean} = \frac{1}{N}\sum_{i=1}^{N} x_i \quad \text{(Equ. 1)}$$

$$\text{RMS} = \sqrt{\frac{1}{N}\sum_{i=1}^{N} x_i^2} \quad \text{(Equ. 2)}$$

$$\text{standard deviation} = \sqrt{\frac{1}{N-1}\sum_{i=1}^{N}(x_i - \text{mean})^2} \quad \text{(Equ. 3)}$$

$$ROC = \frac{x_i - x_{i-1}}{T} \quad \text{(Equ. 4)}$$

$$\Delta R = X_{MAX} - X_{MIN} \quad \text{(Equ. 5)}$$

where N is the total number of data points in the sample period, $x_i$ and $x_{i-1}$ are two consecutive values of the pressure signal and T is the time interval between the two values. Further, $X_{MAX}$ and $X_{MIN}$ are the respective maximum and minimum of the pressure signal over a sampling or training time period. These statistical parameters may be calculated using different equations or algorithms as well.

Also, other types of parameters may be generated in addition to, or instead of, these parameters. For example, the pressure signal may be filtered (e.g., using a low pass, high pass, band pass, etc., filter) to generate a corresponding parameter. One or more filters may be included and each may comprise, for example, a finite impulse response or an infinite impulse response filter. Further, analog or digital filters could be used, for example. Still further, correlation parameters could be generated. For example, a correlation of the pressure signal with a pattern, with a past segment of the pressure signal, with a signal corresponding to another process signal, etc., could be generated. In one example, the statistical parameter generator 104 may comprise one or more ADBs and/or SPM blocks.

One or more of the statistical parameters may be provided to an event detector 108. The event detector 108 may also receive nominal values 112 and sensitivity parameters 114 from a memory 116. The nominal values 112 may comprise, for example, the nominal or (i.e., typical) statistical parameter values corresponding to the statistical parameters generated by the statistical parameter generator 104. The nominal values may be, for example, generated by the statistical parameter generator 104 which generates, or learns, the nominal or normal statistical parameters during normal operation of the process. These statistical parameters can be used to generate the nominal values 112 in the memory 116 for future use. This may allow, for example, dynamic adjustment of nominal values 112 for different operating conditions. In this example, the statistical parameters generated by the statistical parameter generator 104 may be monitored for a user selectable period of time. As another example, the nominal values may be provided by the manufacturer of the pressure sensing device 50 and stored in the memory 116 during manufacture. As yet another example, the nominal values may be updated, periodically or otherwise, by sending nominal values to the pressure sensing device 50 via the bus 18 (FIG. 1).

Each sensitivity parameter value 114 may provide, for example, an acceptable range or relationship as determined by the appropriate rule between the calculated statistical parameters 114 and the appropriate nominal values generated by the statistical parameter generator 104. The sensitivity parameter values 114 may be, for example, set by the manufacturer, received via the bus 18, etc. The sensitivity parameters 114 may be adjusted for the specific application.

The event detector 108 may generate indications of one or more events associated with the one or more parameters generated by the parameter generator 104. Examples of events that the event detector 108 may detect are discussed below. The event detector 108 may detect other events in addition to, or instead of, these events.

Drift

An indication of a drift event may be generated, for example, when the pressure signal changes over time from a nominal value. In one example, the mean of the pressure signal, the nominal value of the mean (mean'), and a tuning parameter alpha ($\alpha$) may be analyzed to detect a drift event. Drift event detection sensitivity may be controlled by the sensitivity parameter $\alpha$, which may represent a percentage above or below the nominal mean that is tolerable before a drift event is detected. The event detector 108 may determine if drift events occur according to the following example rules:

if mean<mean'(1−$\alpha$) then negative drift event detected if mean>mean'(1+$\alpha$) then positive drift event detected, where the value of mean is the current mean of the pressure signal generated from the statistical parameter generator 104 and the values of mean' and ∀ are obtained from the memory 116. Optionally, the mean may be monitored over time, and a drift event may be detected only if, over a series of consecutive sampling periods, the mean is moving away from the nominal value. The nominal value of mean (mean') may be learned by the subsystem 100 during normal operation of the process.

Bias

An indication of a bias event may be generated, for example, when a temporary drift "stabilizing" at a certain level above or below the nominal pressure value occurs. Once the drift stops, the resulting signal has a bias, or an offset from the nominal value. A bias may be detected using, at least in part, the same rules discussed above for drift, for example. Additionally, the mean may be monitored over time, and if the mean is not continuing to move away from the nominal mean value (mean'), then it may be determined that the event is a bias event and not a drift event.

Noise

An indication of a noise event may be generated if the standard deviation of the pressure signal rises above a threshold. In one example, noise detection sensitivity may be adjusted by adjusting a sensitivity parameter beta ($\beta$), which is an amount that the current standard deviation can be above the nominal standard deviation value (standard deviation') before an indication of a noise event is generated. For example, if the user desires to detect a noise event when the pressure signal is twice as noisy as the nominal value, $\beta$ should be sent to 2.0. Range ($\Delta R$) may also used to determine whether to generate a noise event. For example, $\Delta R$ could be used to differentiate noise from normal signal variations. An example rule for determining whether a noise event has occurred is:

if standard deviation>$\beta$·standard deviation' AND if $\Delta R$>$\Delta R$' then noise event detected where "standard deviation" and $\Delta R$ are the current standard deviation and the current range, respectively, generated by the statistical parameter generator 104, and $\beta$ is retrieved from the memory 116.

Stuck

A stuck event is an event in which a condition of the pressure signal does not vary with time. Stuck sensitivity may be controlled by adjusting a sensitivity parameter gamma ($\gamma$). A value for $\gamma$ may be expressed as a percentage of the nominal standard deviation (standard deviation') and may represent how small a change in standard deviation from the nominal value indicates a stuck event. For example, if a user wishes to detect a stuck event when the process signal noise level is half of the nominal value, $\gamma$ should be set equal to 50 percent (0.5). Further, the range ($\Delta R$) may be used to reduce stuck event detection errors that might arise with small signals. One example rule is:

If (standard deviation+$\Delta R$)≦$\gamma$(standard deviation'+$\Delta R$') then stuck event is detected.

Spike

A spike event is an event in which the pressure signal momentarily goes to an extreme value. Sensitivity to spikes in the pressure signal may be controlled by adjusting a sensitivity parameter delta ($\delta$), which may indicate a maximum rate of change ($ROC_{MAX}$) between two consecutive data points in the pressure signal before a spike event is detected. For example, if the user wishes to detect any spikes that have a rate of change (ROC) that is 30% greater than $ROC_{MAX}$, $\delta$ should be set to 1.30. An example rule is:

if ROC>$\delta$·$ROC_{MAX}$ then a spike event is detected

Another method for detecting a spike may include detecting if the pressure signal stays above a positive threshold, or stays below a negative threshold, for some period of time. The threshold values could be adjusted for different sensitivities to spike events.

Other events that may be detected include a cyclic event that indicates cyclical oscillations in the pressure signal and an erratic event that indicates erratic behavior in the pressure signal. It should be understood that other rules may be implemented to observe the above discussed events as well as other events related to the pressure signal, and different formulas, equations, computational techniques, etc., may be used to detect events.

Detecting an event may include analyzing more than one statistical parameter generated by the statistical parameter generator 104, analyzing statistical parameters based on signals other than the pressure signal, etc. For example, statistical parameters may be generated by the motor sensor 42 (using a subsystem similar to the subsystem 100, for example) based on data obtained by the motor sensor 42.

The event detector 108 could receive one or more of the statistical parameters generated by the motor sensor 42 and use these parameters in analyzing whether events have occurred. Similarly, statistical parameters or other types of data from additional pressure sensor devices or other devices could be analyzed by the statistical parameter generator 104 to detect an event associated with the pressure signal.

As one example, nominal values may be obtained by first determining that the pressure or the process is stable, and then generating the statistical parameters for a selectable period of time. These statistical parameter values may be stored as the nominal values. The selectable period of time should be about the same as sampling period or block used to generate the statistical parameters during operation, but in some instances or implementations the selectable period of time may be different (even significantly so) than the sampling period or block used to generate the statistical parameters during operation. Such a process may be user initiated or automated, for example.

The event detector 108 may be implemented using any number of techniques. For example, the event detector 108 may comprise one or more of a rule-based engine, a fuzzy logic engine, a pattern detector, a neural network, etc. Additionally, the example event detector 108 discussed above provides indications of whether events have occurred based upon the operation of rules. It should be understood that, in other examples, an output of the event detector 108 corresponding to an event may have a plurality of discrete or continuous values.

The subsystem 100 further includes an abnormal situation detector 120. The abnormal situation detector 120 analyzes the outputs generated by the event detector 108 to generate an indicator (or indicators) of whether an abnormal situation exists with respect to the agitator 30. The abnormal situation detector 120 may also analyze the pressure signal and data stored in the memory 116. Further, the abnormal situation detector 120 may receive other data via, for example, the bus 18 (FIG. 1) such as other process or control signals, statistical parameters or event indicators generated by subsystems similar to the subsystem 100 corresponding to other devices in the process plant, etc. As one example, statistical parameters and/or statistical events may be generated by the motor sensor 42 (using a subsystem similar to the subsystem 100, for example) based on data obtained by the motor sensor 42. The abnormal situation detector 120 could receive one or more of these statistical parameters and statistical and use these parameters and events in analyzing whether one or more abnormal situations associated with the agitator 30 exist. As another example, statistical parameters or other types of data from additional pressure sensor devices or other devices could be analyzed by the abnormal situation detector 120 to generate the indicator (or indicators) of whether an abnormal situation exists.

The indicator(s) generated by the abnormal situation detector 120 may comprise, for example, an alert, an alarm, etc. Referring also to FIG. 1, if the abnormal situation detector 120 is implemented by the device 50, the indicator(s) may be transmitted to another device such as the controller 12, the workstation 14, the communication server 60, etc., so that, for example, an operator can be made aware of the indicator(s). The device 50 could transmit the indicator at its own initiative or at the request of some other device. For example, some other device such as the controller 12, the workstation 14, the communication server 60, etc., could poll the device 50 as to whether it has detected an abnormal situation associated with the agitator. In response, the device 50 could transmit the indicator via the bus 18 or some other communication link. As another example, the indicator could be stored in a memory and some other device could read the memory to determine if an abnormal situation associated with the agitator had been detected.

The output of the abnormal situation detector 120 could be used, not merely to notify an operator, but also to, for example, directly affect control of the reactor unit 16 or some other portion of the process plant. For example, the indicator generated by the abnormal situation detector could be provided to one or more of a control block or routine, to a maintenance system, etc. For instance, the output of the abnormal situation detector 120 could be provided to the controller 12 which could shut down the reactor unit 16 if one or more abnormal situations are detected.

The abnormal situation detector 120 may be implemented using any number of techniques. For example, the abnormal situation detector 120 may comprise one or more of a rule-based engine, a fuzzy logic engine, a pattern detector, a neural network, etc. In some implementations, the event detector 108 may be omitted, and the parameters generated by the statistical parameter generator 104 may be provided directly to the abnormal situation detector 120.

Optionally, the pressure signal may be filtered prior to providing it to the statistical parameter generator 104 and/or the abnormal situation detector 120 using, for example, a low-pass filter, a bandpass filter, a highpass filter, etc. Similarly, the pressure signal and a filtered version of the pressure signal may be provided to the statistical parameter generator 104 and/or the abnormal situation detector 120. For example, the statistical parameter generator 104 could generate one statistical parameter based on the unfiltered pressure signal and generate another statistical parameter based on the filtered pressure signal.

Figure 3:
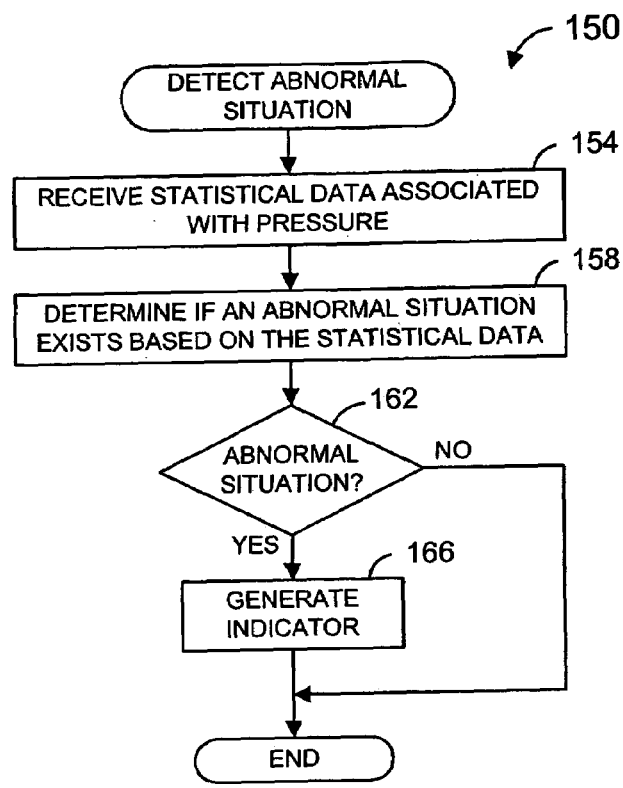
FIG. 3 is a flow diagram of an example method for detecting an abnormal situation associated with an agitator of a reactor in a process plant.

FIG. 3 is a flow diagram of an example method 150 that may be implemented by the subsystem 100 of FIG. 2 to detect an abnormal situation associated with an agitator of a reactor. For example, the method 150 may be used to detect if the agitator is broken and/or has stopped turning. Although FIG. 3 will be discussed with reference to FIG. 2, it is to be understood that the method 150 or a similar method could be implemented by a system different than the subsystem 100.

At a block 154, statistical data associated with pressure sensed within a reactor vessel of the reactor is received. With respect to the example subsystem 100 of FIG. 2, the abnormal situation detector 120 may receive statistical parameters from the statistical parameter generator 104 and/or indications of events from the event detector 108. From another viewpoint, the event detector 108 may receive statistical parameters from the statistical parameter generator 104.

In general, the statistical data received at the block 154 may comprise, for example, one or more of a mean, a variance, a standard deviation, a root-mean square, a rate of change, a range, etc., associated with a pressure signal. Additionally or alternatively, the statistical data may comprise one or more indicators of events such as drift, bias, noise, stuck, spike, cyclic, etc. The statistical data may comprise other statistical measures or indicators associated with the pressure signal in addition to, or instead of, the statistical measures and indicators explicitly listed above. As just one example, the statistical data may comprise correlation data associated with the pressure signal.

At a block 158, the statistical data received at the block 154 may be analyzed to determine if an abnormal situation associated with the agitator exists. For example, the abnormal situation detector 120 and/or the event detector 108 may analyze data received from the statistical parameter generator 104. Other data in addition to the statistical data received at the block 154 may also be analyzed. For example, a pressure signal from which the statistical data was generated could be analyzed. As another example, other data associated with a device that generated the pressure signal could be analyzed (e.g., alerts and/or alarms generated by the device, diagnostics data, etc. As yet another example, data received from other field devices, a controller, a workstation, etc., could be analyzed. For instance, data indicating a current operation of a motor that powers the agitator, data associated with a control signal for controlling the motor, etc., could be analyzed. Further pressure signals generated by additional pressure sensing devices and/or statistical data generated from those pressure signals could be analyzed.

At a block 162, if an abnormal situation has not been detected, the method may end. If, however, an abnormal situation has been detected, the flow may proceed to a block 166. At the block 166, an indicator of the abnormal situation may be generated. The indicator may comprise, for example, an alarm or alert to notify an operator. As another example, the indicator may additionally or alternatively comprise data for affecting a control routine or block.

Several additional example methods for detecting example abnormal situations associated with a reactor agitator are provided below. Although these methods are discussed with reference to FIG. 2, it is to be understood that these methods or similar methods could be implemented by a system different than the subsystem 100.

Figure 4:
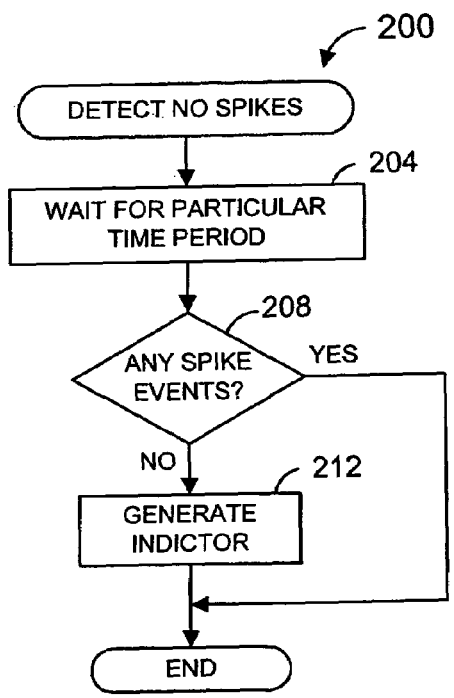
FIG. 4 is a flow diagram of an example method for detecting that an agitator of a reactor is broken and/or not moving.

FIG. 4 is a flow diagram of an example method 200 that may be implemented by the subsystem 100 of FIG. 2 to detect that the agitator is broken and/or not moving. At a block 204, the abnormal situation detector 120 may wait for a particular time period to receive spike event indicators. An indication of the particular time period may be stored, for example, in the memory 116. As another example, the particular time period may be calculated based on an expected rate or period of rotation of the agitator. The time period may be, for example, a specific amount of time or an amount of time calculated based on the expected rotation rate of the agitator. For example, the amount of time could be some fraction (e.g., ¼, ⅓, ½, etc.), or some multiple (e.g., 1, 2, 3, 4, etc.), of the expected period of rotation.

Next, at a block 208, it may be determined if any of spike events occurred during the time period of the block 154. If at least one spike event occurred, the method may end. If however, no spike events occurred, an indicator may be generated at the block 212. The indicator may indicate, for example, that no pressure spikes were detected, that no movement of the agitator was detected, that the agitator may be broken, etc. The generated indicator may comprise, for example, an alert or alarm to notify an operator. As another example, the indicator may additionally or alternatively comprise data for affecting a control routine or block.

Figure 5:
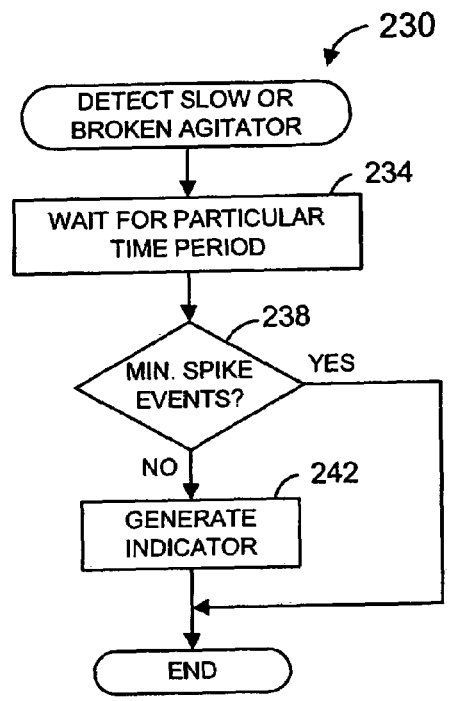
FIG. 5 is a flow diagram of an example method for detecting that an agitator is broken and/or moving more slowly than expected.

FIG. 5 is a flow diagram of an example method 230 that may be implemented by the subsystem 100 of FIG. 2 to detect that the agitator is not moving, is moving more slowly than expected, and/or is broken (e.g., a paddle has fallen off or is broken). At a block 234, the abnormal situation detector 120 may wait for a particular time period to receive spike event indicators. An indication of the particular time period may be stored, for example, in the memory 116. As another example, the particular time period may be calculated based on an expected rate or period of rotation of the agitator. The time period may be, for example, a specific amount of time or an amount of time calculated based on the expected rotation rate of the agitator. For example, the amount of time could be some fraction (e.g., ¼, ⅓, ½, etc.), or some multiple (e.g., 1, 2, 3, 4, etc.), of the expected period of rotation.

Next, at a block 238, it may be determined if a minimum number of spike events occurred during the time period of the block 154. An indication of the minimum number of spike events may be stored, for example, in the memory 116. The minimum number of spike events may comprise some minimum number of spike events that would be expected if the agitator were moving at the expected rate. If at least the minimum number occurred, the method may end. If however, less than the minimum number occurred, an indicator may be generated at the block 242. The indicator may indicate, for example, that less pressure spikes than expected were detected, that the agitator may be moving more slowly than expected, or may be broken, etc. The generated indicator may comprise, for example, an alert or alarm to notify an operator. As another example, the indicator may additionally or alternatively comprise data for affecting a control routine or block.

Figure 6:
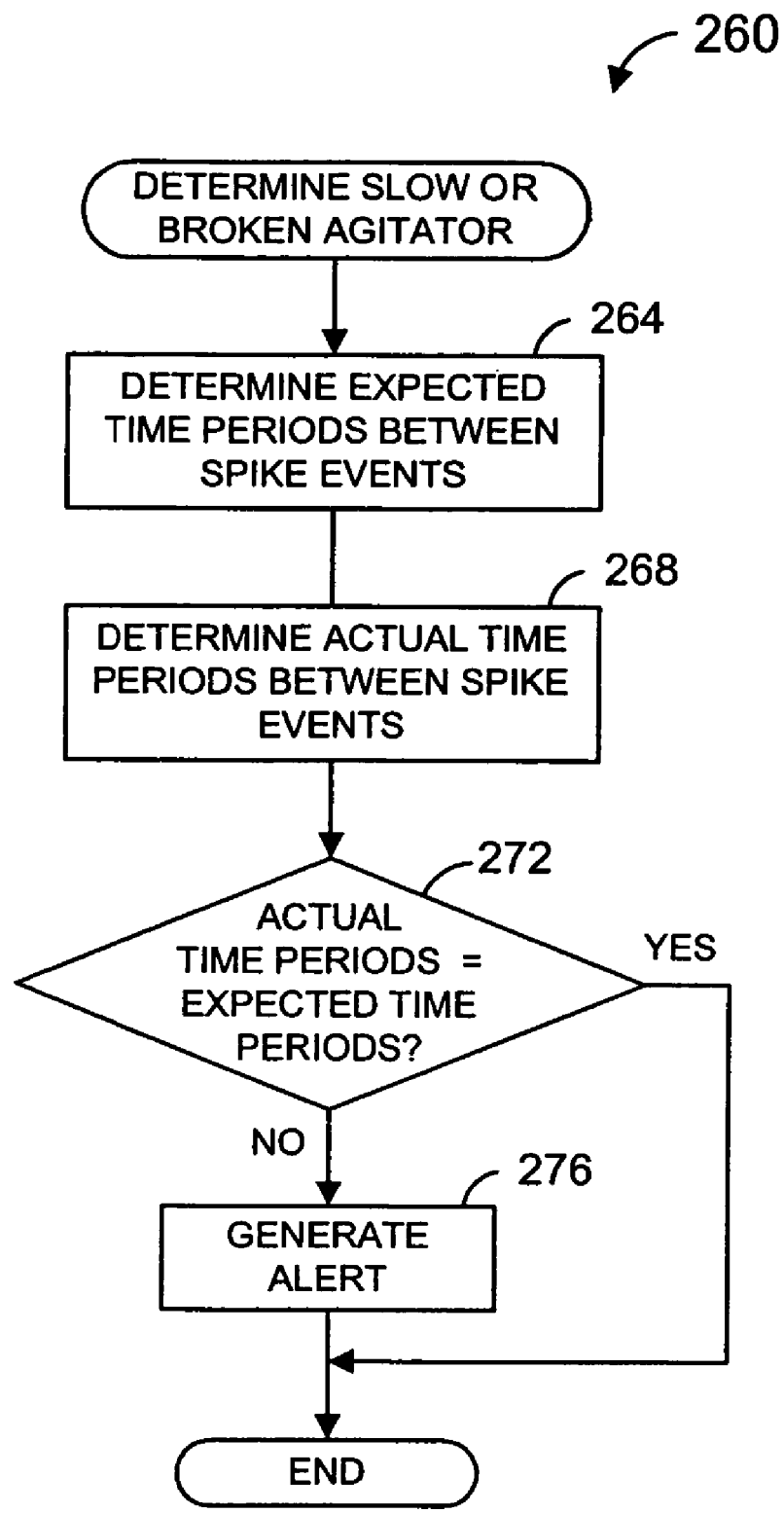
FIG. 6 is a flow diagram of another example method for detecting that the agitator is broken and/or moving more slowly than expected.

FIG. 6 is a flow diagram of another example method 260 that may be implemented by the subsystem 100 of FIG. 2 to detect that the agitator is not moving, is moving at a different speed than expected, and/or is broken. At a block 264, expected time periods between spike events may be calculated. These expected time periods may be stored, for example, in the memory 116. The expected time periods may be calculated based on, for example, an expected rate or time period of rotation of the agitator, a number of paddles on the agitator, etc. Next, at a block 268, actual time periods between spike events may be calculated. For example, the abnormal situation detector 120 may measure time periods between spike events indicated by the event detector 108.

Then, it may be determined if the actual time periods calculated at the block 272 are substantially equal to the expected time periods determined at the block 264. For example, it may be determined if the actual time periods calculated at the block 272 are within some range or ranges of the expected time periods determined at the block 264. An indication or indications of the range or ranges may be stored, for example, in the memory 116. As an example, it may be determined that the actual time periods are not substantially equal to the expected time periods if some minimum number of the actual time periods are not within range of the corresponding expected time periods. The minimum number may be 1, 2, 3, etc., for example. As yet another example, it may be determined if the actual time periods calculated at the block 272 are greater than the expected time periods determined at the block 264 or greater than the expected time periods plus some range or ranges.

If the actual time periods calculated at the block 272 are substantially equal to the expected time periods determined at the block 264, the method may end. If, however, the actual time periods are not substantially equal to the expected time periods, an indicator may be generated at the block 276. The indicator may indicate, for example, that time periods between spikes are not within an expected range, that the agitator may be moving at a speed that is different than expected, that the agitator be broken, etc. The generated indicator may comprise, for example, an alert or alarm to notify an operator. As another example, the indicator may additionally or alternatively comprise data for affecting a control routine or block. A method similar to the method 260 could be used in which an expected spike event rate may be compared to an actual spike event rate.

Figure 7:
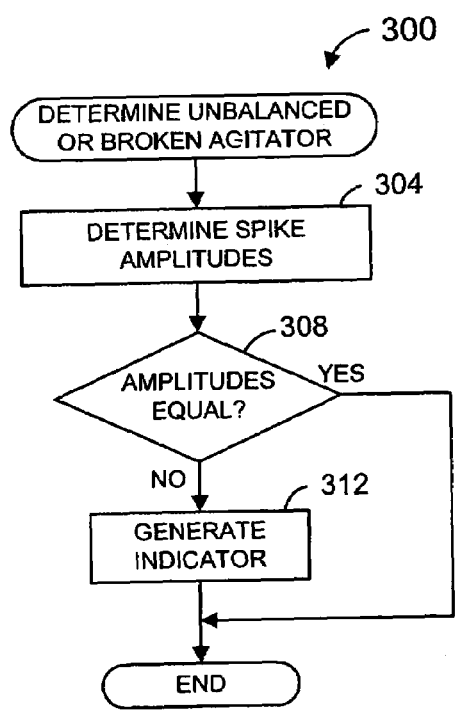
FIG. 7 is a flow diagram of an example method for detecting an unbalanced and/or broken agitator.

FIG. 7 is a flow diagram of another example method 300 that may be implemented by the subsystem 100 of FIG. 2 to detect an unbalanced and/or broken agitator. At a block 304, amplitudes of spikes in the pressure signal are determined. For example, the abnormal situation detector 120 could analyze the pressure signal at times corresponding to spike events to determine amplitudes of the spikes. As another example, the abnormal situation detector 120 could analyze the pressure signal to identify spikes in the pressure signal and to determine the amplitudes of the identified spikes.

At a block 308, it may be determined if the spike amplitudes are approximately equal. For example, it may be determined if differences between the spike amplitudes corresponding to different spikes events are within a specified range. As another example, it may be determined if an amplitude of each pressure spike is within a specified range. The specified range or ranges may be stored, for example, in the memory 116.

If the spike amplitudes determined at the block 304 are approximately equal, the method may end. If, however, the spike amplitudes are not approximately equal, an indicator may be generated at the block 312. The indicator may indicate, for example, pressure spike amplitudes are not within an expected range, that the agitator may be unbalanced, that the agitator may be broken, etc. The generated indicator may comprise, for example, an alert or alarm to notify an operator. As another example, the indicator may additionally or alternatively comprise data for affecting a control routine or block.

Although the example methods described with respect to FIGS. 4–7 used spikes in the pressure signal to detect abnormal situations with the agitator, other data could be used as well. For example, other statistical parameters and/or event notifications generated based on the pressure signal could used (e.g., mean, RMS, standard deviation, variance, range, drift event indicator, bias event indicator, noise event indicator, stuck event indicator, cyclic event indicator, etc.). As another example, other data associated with a device that generated the pressure signal could be analyzed (e.g., alerts and/or alarms generated by the device, diagnostics data, etc.). As yet another example, data received from other field devices, a controller, a workstation, etc., could be analyzed. For instance, data indicating a current operation of a motor that powers the agitator, data associated with a control signal for controlling the motor, etc., could be analyzed. Further pressure signals generated by additional pressure sensing devices, statistical data generated from those pressure signals, diagnostic data from those other devices, etc., could be analyzed.

Figure 8:
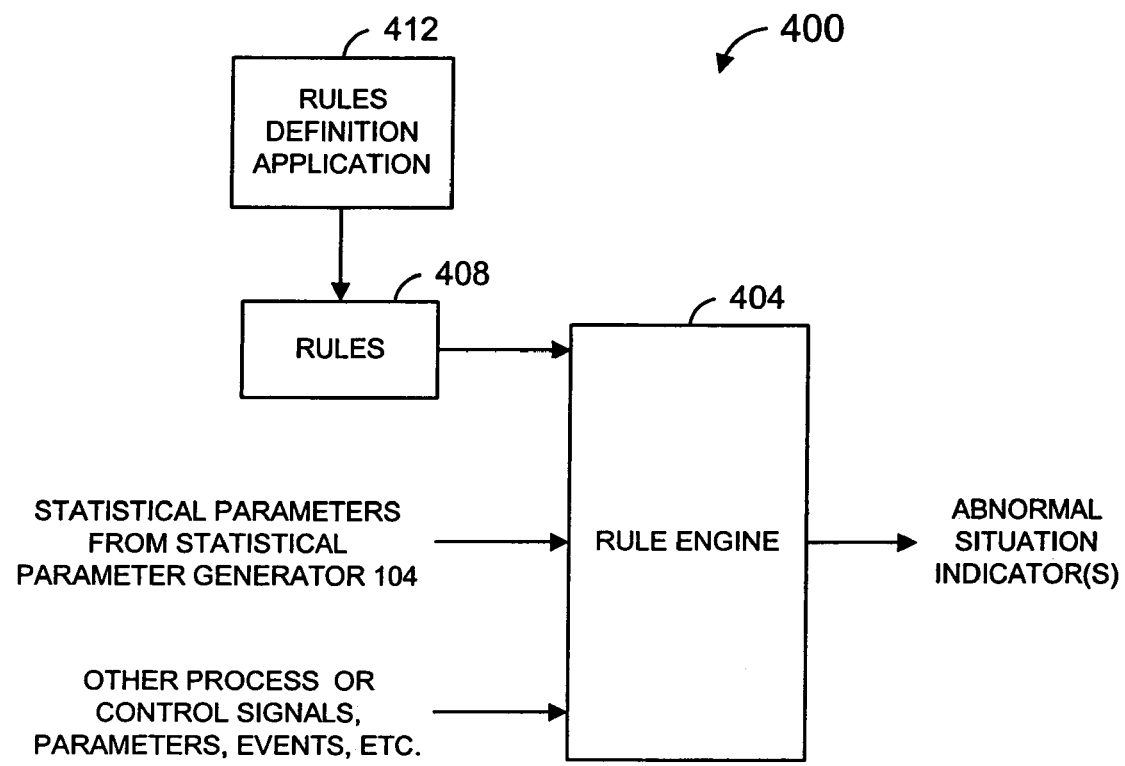
FIG. 8 is a block diagram of an example rules-based system that may implement some or all of the subsystem of FIG. 2.

Referring again to FIG. 2, the event detector 108 and/or the abnormal situation detector 120 may be implemented via a rules-based expert engine, for example. FIG. 8 is a block diagram of an example rules system 400 to implement the event detector 108 and/or the abnormal situation detector 120, or portions of the event detector 108 and/or the abnormal situation detector 120.

The rules system 400 may include a rules engine 404, which may be any type of rules based expert engine and a set of rules 408 which may be stored in a database (such as within a memory of the device 50, a memory of the controller 12, a memory of the workstation 14, etc.) accessible by the rules engine 404. The rules engine 404 analyzes statistical parameters generated by the statistical parameter generator 108, which as discussed previously, may comprise one or more SPM blocks.

The rules engine 404 may also analyze other data such as the pressure signal generated by the pressure sensing device 50, other process or control signals, statistical parameters, event indicators, alerts, alarms, diagnostic data, etc., generated by other devices in the process plant. As one example, the rules engine 404 may analyze statistical parameters and/or statistical events generated by the motor sensor 42. As another example, the rules engine 404 may analyze statistical parameters or other types of data from additional pressure sensor devices or other devices.

The rules engine 404 applies the rules 408 to the statistical parameters and, optionally, other data to determine if an abnormal situation exists that indicates, according to at least one of the rules 408, that an alert or alarm should sent to a user, for example. Of course, if desired, the rules engine 404 may take other actions, besides providing or setting an alarm, if a rule indicates that a problem exists. Such actions may include, for example, shutting down or more components of the process, switching control parameters to alter the control of the process, etc.

Optionally, a rules development application or routine 412 may enable a user to develop one or more expert system rules (e.g., to be used as one of the rules 408) based on statistical data patterns and their correlations, to thereby detect abnormal situations associated with the agitator 30. Thus, while at least some of the rules 408 used by the rules engine 404 may be preset or preconfigured, the rules development application 412 enables a user to create other rules based on experiences within the process plant being monitored. For example, if a user knows that a certain combination of SPM parameter conditions or events indicates a certain problem with the agitator 30, the user can use the rules development application 412 to create an appropriate rule to detect this condition and/or, if desired, to generate an alarm or alert or to take some other action based on the detected existence of this condition. U.S. Provisional Patent Application No. 60/549,796, filed Mar. 3, 2004, and entitled "ABNORMAL SITUATION PREVENTION IN A PROCESS PLANT" describes example rules development applications and configuration screens that may be used to create rules for detecting abnormal situations and/or, if desired, for generating alarms, alerts, or for taking some other action based on the detected existence of abnormal situations. Similar or different rules development applications may be used as well to develop the rules 408. U.S. Provisional Patent Application No. 60/549,796 is hereby incorporated by reference herein in its entirety for all purposes.

Of course, during operation of the process plant, the rules engine 404, which may be configured to receive the SPM data, for example, (and any other needed data), applies the rules 408 to determine if any of the rules are matched. If an abnormal situation associated with the agitator 30 is detected based on one or more of the rules 408, an alert can be displayed to a plant operator, or sent to another appropriate person, or some other action may be taken.

The rules engine 404 may be implemented, at least partially, by the pressure sensing device 50. Additionally or alternatively, the rules engine 404 may be implemented, at least partially, by some other device such as one or more other pressure sensing devices, one or more other field devices, the controller 12, the workstation 14, etc. If the rules engine 404 is implemented, at least partially, by some device other than the pressure sensing device 50, the rules engine 404 may be, at least partially, a client system the statistical parameters Additionally, some of the data that may be used by the rules engine 404 are SPM conditions that may be detected within the devices in which the SPM data is generated. In this case, the rules engine 404 may be a client system or may be part of a client system that reads the SPM parameters and conditions from the device 50 via, for example, the communication server 60, the controller 12, etc.

Some or all of the blocks of FIGS. 2 and 8 may be implemented in whole or in part using software, firmware, or hardware. Similarly, the example methods described with respect to FIGS. 3–7 may be implemented in whole or in part using software, firmware, or hardware. If implemented, at least in part, using a software program, the program may be configured for execution by a processor and may be embodied in software instructions stored on a tangible medium such as CD-ROM, a floppy disk, a hard drive, a digital versatile disk (DVD), or a memory associated with the processor, but persons of ordinary skill in the art will readily appreciate that the entire program or parts thereof could alternatively be executed by a device other than a processor, and/or embodied in firmware and/or dedicated hardware in a well known manner. For example, any or all of statistical parameter generator 104, the event detector 108, the abnormal situation detector 120, and the rules engine 404 could be implemented by software, hardware, and/or firmware. Further, although the example methods have been described with reference to FIGS. 3–7, persons of ordinary skill in the art will readily appreciate that many other methods of implementing the example subsystem 100 of FIG. 2 may alternatively be used. For example, the order of execution of the blocks may be changed, and/or the blocks may be changed, eliminated, or combined.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for detecting an abnormal situation associated with a reactor in a process plant, the method comprising:
    calculating first statistical data from a pressure signal indicative of pressure within a vessel of the reactor, wherein calculating the first statistical data comprises calculating at least one of a mean of the pressure signal, a standard deviation of the pressure signal, a variance of the pressure signal, a root-mean square of the pressure signal, a rate of change of the pressure signal, a range of the pressure signal, a filtered pressure signal, and a correlation associated with the pressure signal;
    analyzing the first statistical data to detect whether one or more abnormal situations associated with an agitator of the reactor exist; and
    generating an indicator of an abnormal situation if one or more of the one or more abnormal situations are detected.

2. A method as defined in claim 1, wherein the pressure signal is generated by a pressure sensor disposed at least partially within the vessel of the reactor.

3. A method as defined in claim 1, wherein calculating the first statistical data further comprises calculating at least one of an indication that a spike in the pressure signal occurred, an indication that the pressure signal includes a bias, an indication that a standard deviation of the pressure signal is greater than a first threshold, an indication that the standard deviation of the pressure signal is less than a second threshold, an indication that the pressure signal includes cyclic oscillations, and an indication that the pressure signal is erratic.

4. A method as defined in claim 1, wherein calculating the first statistical data comprises calculating at least one of an indication that a spike in the pressure signal occurred, an indication that the pressure signal includes a bias, an indication that a standard deviation of the pressure signal is greater than a first threshold, an indication that the standard deviation of the pressure signal is less than a second threshold, an indication that the pressure signal includes cyclic oscillations, and an indication that the pressure signal is erratic.

5. A method as defined in claim 1, wherein the first statistical data is based on a pressure signal generated by a pressure sensor disposed at least partially within a vessel of the reactor;
    wherein analyzing the first statistical data comprises detecting spikes in the pressure signal.

6. A method as defined in claim 1, wherein analyzing the first statistical data comprises determining if a minimum number of spikes in the pressure signal occur during a time period.

7. A method as defined in claim 6, wherein determining if the minimum number of spikes in the pressure signal occur comprises determining if at least one spike in the pressure signal occurs during a particular time period.

8. A method as defined in claim 6, wherein determining if the minimum number of spikes in the pressure signal occur comprises determining if at least N spikes in the pressure signal occur during the particular time period, wherein N is greater than one.

9. A method as defined in claim 1, wherein analyzing the first statistical data comprises:
    determining time periods between spikes in the pressure signal; and
    comparing the determined time periods with expected time periods.

10. A method as defined in claim 1, wherein analyzing the first statistical data comprises:
    determining a rate at which spikes occur in the pressure signal; and
    comparing the determined rate with expected an expected rate.

11. A method as defined in claim 1, wherein analyzing the first statistical data comprises determining amplitudes of spikes in the pressure signal.

12. A method as defined in claim 11, wherein analyzing the first statistical data further comprises determining if each amplitude is within a range.

13. A method as defined in claim 11, wherein analyzing the first statistical data further comprises determining if differences between amplitudes are within a range.

14. A method as defined in claim 1, wherein the pressure signal is generated by a pressure sensor disposed at least partially within the vessel of the reactor, the method further comprising analyzing the pressure signal to detect whether the one or more abnormal situations exist.

15. A method as defined in claim 1, wherein the pressure signal is generated by a pressure sensor disposed at least partially within a vessel of the reactor;
    the method further comprising analyzing second statistical data based on one or more process signals separate from the pressure signal to detect whether the one or more abnormal situations exist.

16. A method as defined in claim 1, wherein the pressure signal is generated by a first pressure sensor disposed at least partially within a vessel of the reactor;

the method further comprising analyzing at least second statistical data to detect whether the one or more abnormal situations exist, wherein the at least second statistical data is based on at least a second pressure signal generated by a at least a second pressure sensor disposed at least partially within the vessel of the reactor.

17. A system for detecting an abnormal situation associated with a reactor in a process plant, the system comprising:
a statistical parameter generator to generate one or more first statistical parameters based on a first pressure signal generated by a first pressure sensor disposed at least partially within a vessel of the reactor, wherein the one or more first statistical parameters comprise at least one of a mean value of the first pressure signal, a standard deviation of the first pressure signal, a variance of the first pressure signal, root-mean square value of the first pressure signal, a rate of change of the first pressure signal, a range of the first pressure signal, a filtered first pressure signal, and a correlation associated with the first pressure signal; and
an abnormal situation detector to detect at least one abnormal situation associated with an agitator of the reactor based on the one or more first statistical parameters, and to generate one or more indicators of one or more abnormal situations that are detected.

18. A system as defined in claim 17, wherein the abnormal situation detector is configured to determine if a minimum number of spikes occur in the first pressure signal during a time period.

19. A system as defined in claim 18, wherein the minimum number of spikes is one.

20. A system as defined in claim 18, wherein the minimum number of spikes is an integer greater than one.

21. A system as defined in claim 17, wherein the abnormal situation detector is configured to determine time periods between spikes in the first pressure signal and to compare the determined time periods to expected time periods.

22. A system as defined in claim 17, wherein the abnormal situation detector is configured to determine a rate at which spikes in the first pressure signal occur and to compare the determined rate to an expected rate.

23. A system as defined in claim 17, wherein the abnormal situation detector is configured to determine amplitudes of spikes in the first pressure signal.

24. A system as defined in claim 23, wherein the abnormal situation detector is configured to determine if each amplitude is within a range.

25. A system as defined in claim 23, wherein the abnormal situation detector is configured to determine if differences between the amplitudes are within a range.

26. A system as defined in claim 17, wherein the abnormal situation detector is configured to detect the one or more abnormal situations further based on the first pressure signal.

27. A system as defined in claim 17, wherein the abnormal situation detector is configured to detect the one or more abnormal situations further based on one or more second statistical parameters based on at least a second pressure signal generated by at least a second pressure sensor disposed at least partially within the vessel of the reactor.

28. A system as defined in claim 17, further comprising an event detector to generate one or more indicators of one or more statistical events based on the one or more first statistical parameters;
wherein the abnormal situation detector is configured to detect the one or more abnormal situations based on the one or more indicators of the one or more statistical events.

29. A system as defined in claim 28, wherein the one or more indicators of the one or more statistical events comprises at least one of an indicator that a spike in the first pressure signal occurred, an indicator that the first pressure signal includes a bias, an indicator that a standard deviation of the first pressure signal is greater than a first threshold, an indicator that the standard deviation of the first pressure signal is less than a second threshold, an indicator that the first pressure signal includes cyclic oscillations, and an indicator that the first pressure signal is erratic.

30. A tangible medium storing machine readable instructions, the machine readable instructions capable of causing one or more machines to:
receive statistical data associated with pressure within a vessel of the reactor, the statistical data calculated from a pressure signal generated by a pressure sensor;
analyze the statistical data to detect whether one or more abnormal situations associated with an agitator of the reactor exist; and
generate an indicator of an abnormal situation if one or more of the one or more abnormal situations are detected.

31. A tangible medium storing machine readable instructions as defined in claim 30, wherein the machine readable instructions are further capable of causing one or more machines to calculate the statistical data based on a pressure signal generated by a pressure sensor disposed at least partially within a vessel of the agitator.

32. A tangible medium storing machine readable instructions as defined in claim 31, wherein the machine readable instructions are further capable of causing one or more machines to calculate at least one statistical parameter based on the pressure signal, wherein the at least one statistical parameter comprises at least one of a mean of the pressure signal, a standard deviation of the pressure signal, a variance of the pressure signal, root-mean square of the pressure signal, a rate of change of the pressure signal, and a range of the pressure signal.

33. A tangible medium storing machine readable instructions as defined in claim 32, wherein the machine readable instructions are further capable of causing one or more machines to calculate at least one indication of a statistical event associated with the pressure signal based on the at least one statistical parameter, wherein the at least one indication of a statistical event comprises at least one of an indication that a spike in the pressure signal occurred, an indication that the pressure signal includes a bias, an indication that a standard deviation of the pressure signal is greater than a first threshold, an indication that the standard deviation of the pressure signal is less than a second threshold, an indication that the pressure signal includes cyclic oscillations, and an indication that the pressure signal is erratic.

34. A tangible medium storing machine readable instructions as defined in claim 31, wherein the machine readable instructions are further capable of causing one or more machines to calculate at least one of an indication that a spike in the pressure signal occurred, an indication that the pressure signal includes a bias, an indication that a standard deviation of the pressure signal is greater than a first threshold, an indication that the standard deviation of the pressure signal is less than a second threshold, an indication that the pressure signal includes cyclic oscillations, and an indication that the pressure signal is erratic.

* * * * *

UNITED STATES PATENT AND TRADEMARK OFFICE
CERTIFICATE OF CORRECTION

PATENT NO. : 7,181,654 B2 Page 1 of 1
APPLICATION NO. : 10/944610
DATED : February 20, 2007
INVENTOR(S) : Ferrill E. Ford et al.

It is certified that error appears in the above-identified patent and that said Letters Patent is hereby corrected as shown below:

In the Specification:

At Column 8, line 34, "herby" should be -- hereby --.

At Column 11, line 45, "∀" should be -- α --.

At Column 12, line 7, "sent" should be -- set --.

At Column 13, line 46, "statistical and" should be -- statistical events and --.

At Column 15, line 6, "etc." should be -- etc.). --.

At Column 16, line 59, "agitator be" should be -- agitator may be --.

At Column 18, lines 61-62, "a client system the statistical parameters" should be -- a client system that reads the statistical parameters. --.

Signed and Sealed this

Twentieth Day of May, 2008

JON W. DUDAS
*Director of the United States Patent and Trademark Office*